United States Patent
Smith (10) Patent No.: US 6,545,447 B1
(45) Date of Patent: Apr. 8, 2003

(54) METHOD AND APPARATUS FOR PLACING A BATTERY PACK THAT IS IN A USABLE MODE INTO A STORAGE SLEEP-MODE ENSURING LONG STORAGE

(75) Inventor: Gregory J. Smith, Tucson, AZ (US)

(73) Assignee: National Semiconductor Corporation, Santa Clara, CA (US)

(*) Notice: Subject to any disclaimer, the term of this patent is extended or adjusted under 35 U.S.C. 154(b) by 70 days.

(21) Appl. No.: 09/851,669

(22) Filed: May 8, 2001

(51) Int. Cl.⁷ ................ H01M 10/44; H01M 10/46
(52) U.S. Cl. ........................ 320/132; 320/135
(58) Field of Search ................ 320/106, 125, 320/127, 128, 131, 132, 135, 161, 162

(56) References Cited

U.S. PATENT DOCUMENTS 5,633,573 A * 5/1997 Van Phuoc et al. ..... 320/152 X
6,072,250 A   6/2000 Thandiwe et al. .......... 307/150
6,144,186 A   11/2000 Thandiwe et al. .......... 320/134

* cited by examiner

Primary Examiner—Edward H. Tso
(74) Attorney, Agent, or Firm—Merchant & Gould, P.C.; Timothy P. Sullivan (57) ABSTRACT

A method and apparatus for placing a battery pack into a storage sleep-mode is provided. The battery pack may be set into a storage sleep-mode when the cell is in a usable mode. After being placed into the storage sleep-mode, the battery pack is awakened when a charge or load is applied to the cell that exceeds a predetermined threshold. A terminal or other end-user accessible connection is not needed to place the battery pack into the storage sleep-mode.

18 Claims, 6 Drawing Sheets

METHOD AND APPARATUS FOR PLACING A BATTERY PACK THAT IS IN A USABLE MODE INTO A STORAGE SLEEP-MODE ENSURING LONG STORAGE

FIELD OF THE INVENTION

The present invention relates to rechargeable batteries, and more specifically to storing rechargeable batteries for an extended time.

BACKGROUND OF THE INVENTION

Many portable electronic devices utilize a rechargeable battery to provide power. These devices include computers, cellular telephones, pagers, radios, and the like. While there are many types of rechargeable batteries used today, including nickel cadmium and nickel metal hydride, lithium ion batteries have become a popular choice. Lithium ion batteries are typically smaller, lighter, and a have a higher charge capacity than other popular rechargeable battery types.

Rechargeable batteries may be stored for long periods of time before an initial use potentially resulting in deeply discharging the cell during the storage time. Shipping a battery at a full charge may create a safety problem. A fully-charged battery presents more of a threat of explosion than a half-charged battery. Therefore, batteries are typically only charged a fraction of their full capacity before shipment. For example, a battery may be charged to a level of fifty-percent capacity before leaving the factory. The amount of energy lost between the time when the battery is initially charged before shipment and the first use of the battery can result in the battery being deeply discharged. Even when the battery is not being used within an electronic device, energy is lost due to the internal circuitry contained within the battery. If the battery is discharged too deeply, the life cycle of the battery may be reduced. Potentially, the battery may not be able to store energy if discharged too deeply.

SUMMARY OF THE INVENTION

Briefly described, the present invention is directed at providing a system for storing rechargeable batteries. More specifically, the battery pack is placed into a storage sleep-mode before shipment to the user and remains in the storage sleep-mode until the battery pack senses a charge or load that exceeds a predetermined threshold.

According to one aspect of the invention, the battery pack is put in a storage sleep-mode when the cell state is in a usable mode. The usable mode may be set based on the cell voltage.

According to another aspect of the invention, the battery pack is awakened from the storage sleep-mode when a charge or load to the battery pack exceeds a predetermined threshold. The predetermined threshold may be set based on cell characteristics.

According to yet another aspect of the invention, a terminal or other end-user accessible connection is not needed to place the battery pack into the storage sleep-mode.

According to still yet another aspect of the invention, a charging signal is coupled to the cell during normal operation and decoupled when the battery pack is in the storage sleep-mode.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. The term "battery pack" includes single cell batteries and multiple cell batteries. The term "cell" includes single rechargeable cells and multiple rechargeable cells. Referring to the drawings, like numbers indicate like parts throughout the views.

The present invention is directed at providing a method and apparatus for placing a battery pack into a storage sleep-mode. More particularly, the battery pack may be placed into the storage sleep-mode when the cell state is in a usable mode. The battery pack is awakened from the storage sleep-mode by the attachment of either a charge or a load to that exceeds a predetermined threshold. Accordingly, these features help a battery pack manufacture to store battery packs for an extended period and also allow the electronics designer to use a higher nominal supply current easing some costly constraints required to meet very low supply currents.

Figure 1:
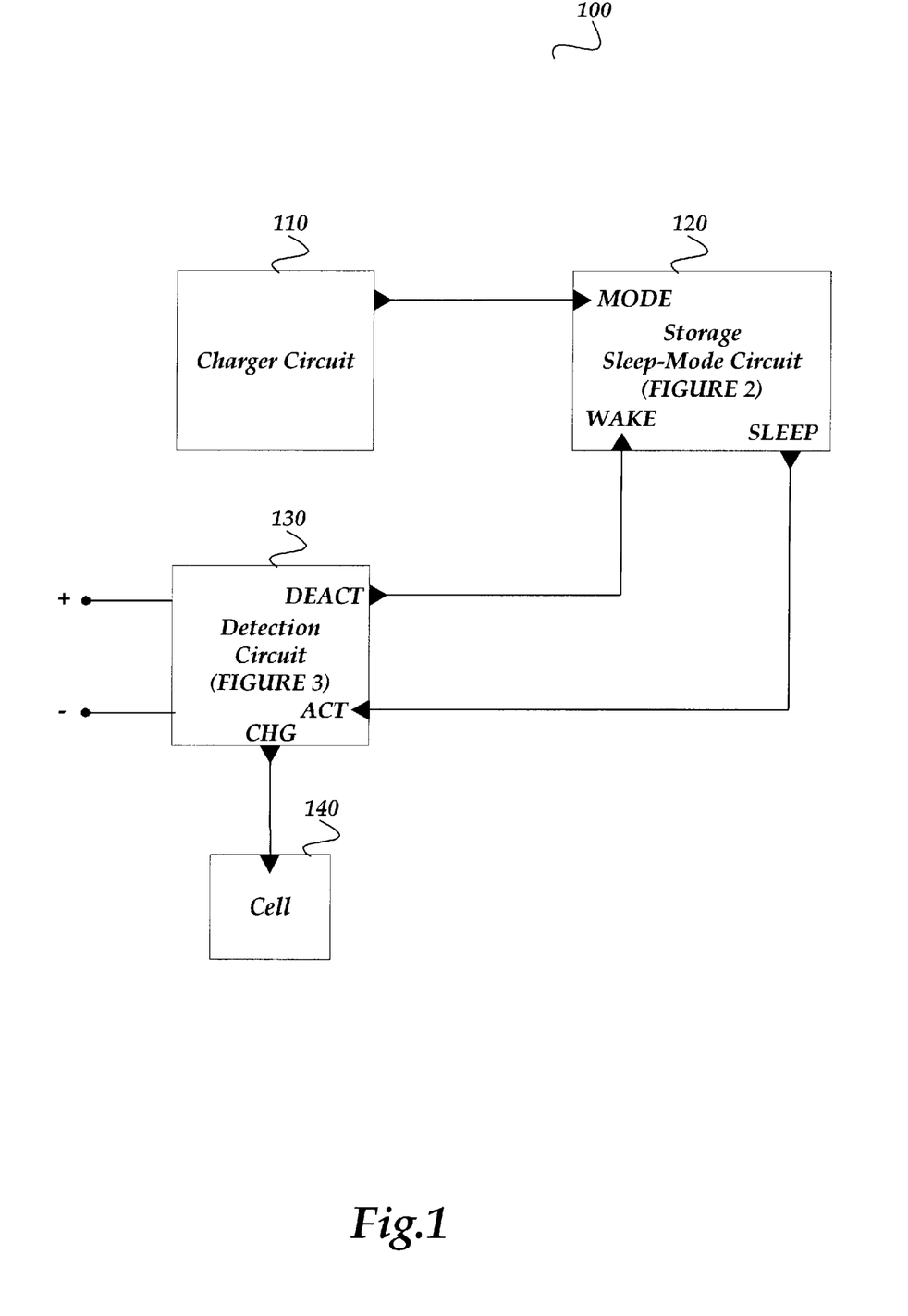
FIG. 1 shows an overview schematic block diagram of a battery storage sleep-mode system.

FIG. 1 shows a schematic of a battery storage sleep-mode system according to one embodiment of the invention. As shown in the figure, battery storage sleep-mode system 100 includes a charger circuit 110, a storage sleep-mode circuit 120, a detection circuit 130, and a cell 140.

Charger circuit 110 includes an output port arranged to provide a logic signal. Storage sleep-mode circuit 120 includes an input port MODE arranged to receive the logic signal provided by charger circuit 110, an input port WAKE, and an output port SLEEP. Detection circuit 130 includes a positive and negative terminal, an input port ACT arranged to receive the SLEEP signal provided by storage sleep-mode circuit 120, an output port DEACT arranged to provide an awaken signal to the WAKE input port of storage sleep-mode circuit 120, and an output port CHG arranged to provide a charging signal to cell 140. Cell 140 includes an input port for receiving the charging signal from detection circuit 130.

According to another embodiment, a charger control circuit (not shown) may be included to control the charging of cell 140. According to this embodiment, the charger control circuit includes an input port for receiving the logic signal provided by charger circuit 110, and an output port arranged to provide a charging signal to cell 140.

Charge circuit 110 provides a mode signal having a high ("1") logic state and a low ("0") logic state to storage sleep-mode circuit 110 based on the current mode of cell 140. According to one embodiment, cell 140 may be in two modes including a usable mode and an unusable mode. When cell 140 is within a nominal voltage range, charge, circuit 110 produces a high logic signal; otherwise charge circuit 110 produces a low logic signal. For example, the voltage range may be defined to be between the point the battery pack places the battery into a sleep mode and the point the charge is terminated to the cell. According to one embodiment, the range is slightly less than the range defined by the sleep mode and the charge terminate mode. This helps to ensure that the cell is not stored at a charge level that may result in the cell's life being diminished. As will be appreciated in view of the present disclosure, charge circuit 110 may produce some other signal indicating that cell 140 is within a usable mode. Additionally, more modes may be included. According to another embodiment, the logic signal may be used to control charge circuitry (not shown), to charge cell 140 based on the mode of the cell. For example, when logic signal is high, fast charge currents could be enabled.

Figure 2:
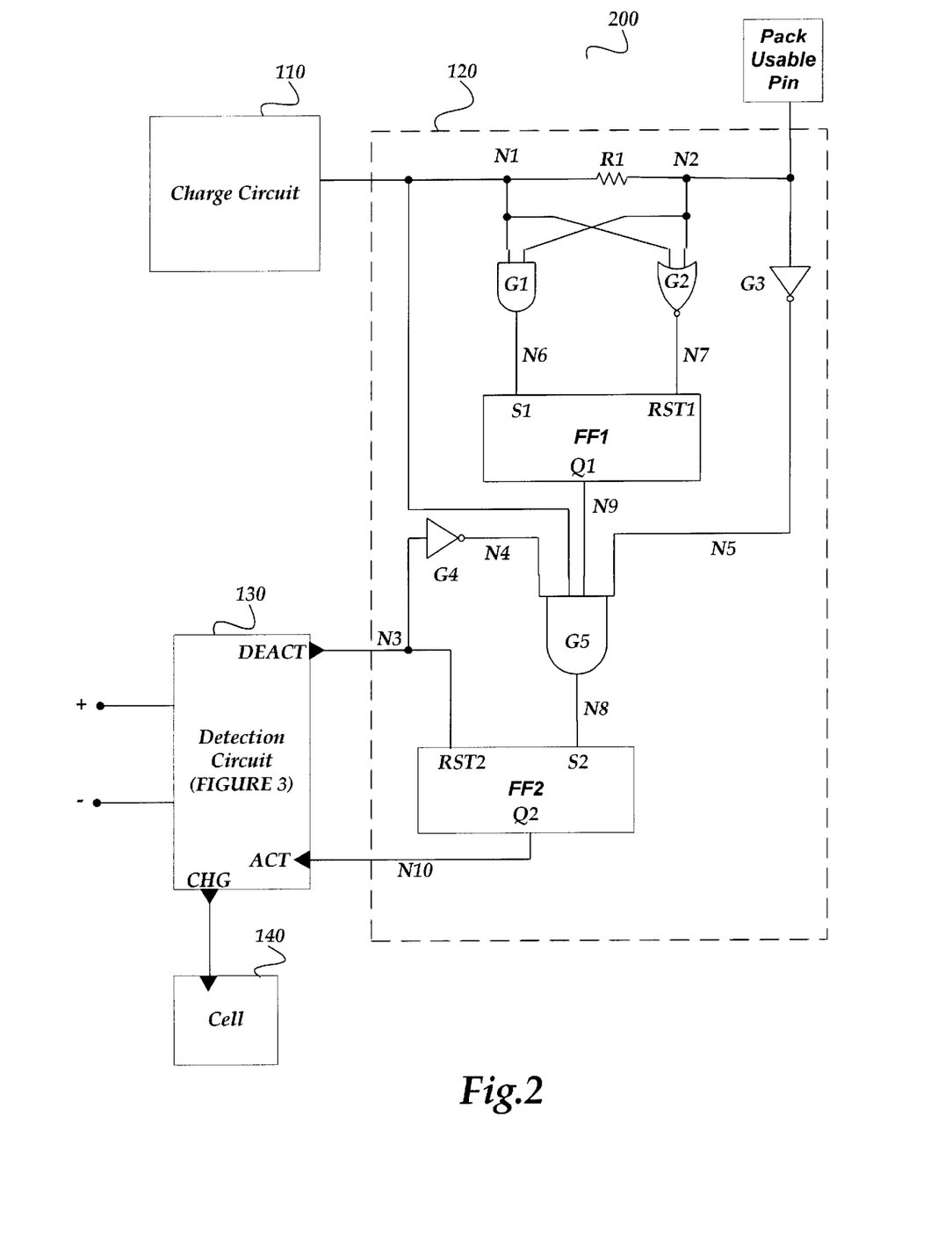
FIG. 2 shows a schematic diagram of a storage sleep-mode circuit.

Storage sleep-mode circuit 120 may set the battery pack into a storage sleep-mode after when the cell state is in a usable mode and awaken the battery pack when a charge or load is applied to the battery pack (See FIG. 2 and related discussion). Briefly described, the battery pack is placed into a storage sleep-mode by momentarily grounding storage sleep-mode circuit 120 when cell 140 is in a usable mode. When the storage sleep-mode is activated, storage sleep-mode circuit 120 produces a sleep signal at output port SLEEP instructing detection circuit 130 to shut off the charging signal to cell 140. Storage sleep-mode circuit 120 is activated by an awaken signal provided by detection circuit 130.

Detection circuit 130 stops the charging signal from being delivered to the cell when instructed by storage sleep-mode circuit 120, and determines when a charge or load has been applied to the battery pack terminals. Detection circuit 130 determines when a load or charge has been applied to the terminals that exceed a predetermined threshold. When the predetermined threshold has been exceeded, detection circuit 130 produces an awaken signal that is used to awaken the battery pack from the storage sleep-mode. When the battery pack is not in the storage sleep-mode (normal operation), detection circuit 130 is arranged to provide a charging signal at the CHG output port to charge cell 140.

FIG. 2 shows a storage sleep-mode system according to one embodiment of the invention. As shown in the figure, storage sleep-mode system 200 includes storage sleep-mode circuit 120 that includes AND gate circuits G1 and G5; NOR gate circuit G2; inverter circuits G3 and G4; flip-flops FF1 and FF2; and resistor circuit R1.

FF1 has an input port S1 that is coupled to node N6, an input port RST1 that is coupled to node N7, and an output port Q1 that is coupled to node N9. FF2 has an input port S2 that is coupled to node N8, an input port RST2 that is coupled to node N3, and an output port Q2 that is coupled to node N10. AND gate G1 has an input that is coupled to node N1, an input that is coupled to node N2, and an output that is coupled to node N6. NOR gate G2 has an input that is coupled to node N1, an input that is coupled to node N2, and an output that is coupled to node N7. The resistor circuit R1 is coupled between node N1 and node N2. The Pack Usable Pin is coupled to the node N2. Inverter circuit G3 includes an input that is coupled to node N2 and an output that is coupled to node N5. Inverter circuit G4 includes an input that is coupled to node N3 and an output that is coupled to node N4. AND gate G5 has inputs that are coupled to nodes N4, N1, N9, and N5, respectively, and an output that is coupled to node N8.

Operation of storage sleep-mode circuit 200 will now be described. When charge circuit 110 produces a high signal (logic "1") at nodes N1 and N2 the output of G1 is high (after some time delay allowing for settling of N2) causing FF1 to be set. FF1 is used to help ensure that FF2 is not inadvertently set when node N1 is initially driven high by charger control circuit 110. Node N2 naturally lags node N1 for some period of time during turn-on and momentarily appears to be in the logic low ("0") state potentially causing FF2 to be inadvertently set. Therefore, FF1 is not set until both node N1 and node N2 are high. Q1 is arranged to provide a high signal at node N9 when FF1 is set. FF1 is reset when both node N1 and node N2 are low.

According to one embodiment of the invention, to place the battery pack into storage sleep-mode, the pack usable pin is momentarily shorted to ground during the time charge circuit 110 produces a high signal holding node N1 high. This produces a high signal at node N8 setting FF2. Q2 then produces a high signal at node N10 activating the storage-sleep mode. One method for grounding the pack usable pin after the battery pack is assembled and tested and ready for storage prior to the end users purchase is to have a PCB pad connected to the pack usable pin. A hole in the plastic molding in the battery pack provides access to the PCB pad. A probe connected to the negative terminal of the pack can be inserted into the hole, grounding the pad. The hole can then be covered with a label or sealed by any other means. Also, it is possible that the hole could align to a seated switch that can perform the momentary grounding. FF2 is reset causing Q2 to be low and awakening the battery pack from the storage sleepmode when detection circuit 130 detects a charge or load that exceeds a predetermined threshold.

Figure 3:
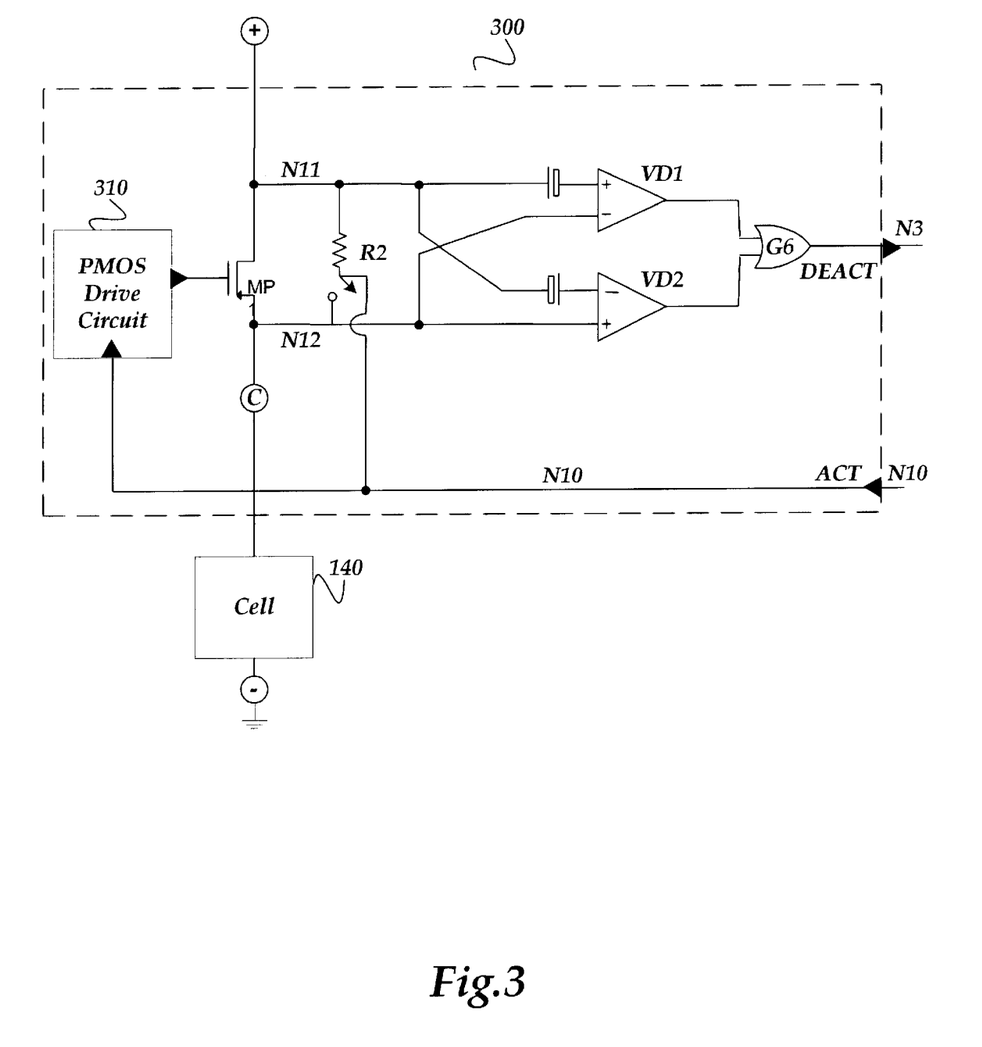
FIG. 3 shows a schematic diagram of a detection circuit.

FIG. 3 shows a detection circuit according to one embodiment of the invention. As shown in the figure, detection circuit 300 includes two comparators VD1, and VD2, transistor circuit MP1, resistor circuit R2, switch circuit SW1, and OR gate circuit G6.

Detection circuit 300 includes an input port ACT that is coupled to node N10 and an output port DEACT that is coupled to node N3. Comparator VD1 has a non-inverting input that is coupled to node N11, an inverting input that is coupled to node N12, and an output that is coupled to an input of OR gate G6. Comparator VD2 has a non-inverting input that is coupled to node N12, an inverting input that is coupled to node N11, and an output that is coupled to an input of OR gate G6. OR gate circuit G6 is arranged to produce an awaken signal at node N3. According to one embodiment of the invention, comparators VD1 and VD2 each have a small input offset. Resistor circuit R2 is coupled between node N11 and switch SW1. Switch SW1 is coupled between resistor circuit R2 and node N12. Transistor circuit MP1 has a source that is coupled to node N12, a gate that is coupled to PMOS drive circuit 310, and a drain that is coupled to node N11. The positive terminal of the battery pack is coupled to node N11 and a C terminal is coupled between the source of transistor MP1 and cell 140. Node N13 is coupled to the ACT input port. PMOS drive circuit 310 has an input port that is coupled to node N10 and an output port that is coupled to the gate of transistor circuit MP1.

Comparators VD1 and VD2 are arranged to trip depending on the potential at nodes N11 and N12. When either comparator VD1 or VD2 trips, the output of G6 produces an awaken signal (logical high "1") at node N3 and resets FF2. Resistor circuit R2 and input offsets are chosen based on the desired awaken threshold for the battery pack. For example, according to one embodiment of the invention, to approximate a 10 mA load and charge current threshold to awaken the battery pack, the input offsets to comparators VD1 and VD2 is set to approximately 20–40 mV and the impedance of resistor R2 is set to approximately 3Ω.

During normal operation (battery pack not in storage sleep-mode) transistor MP1 allows current to flow between the positive terminal and negative terminal. According to one embodiment, power PMOSFET transistor MP1 is a 0.1 Ω Ron FET. Transistor MP1 is also used to restrict load current when excessive loading of cell 140 occurs. When the battery pack is in the storage sleep-mode, PMOS drive circuit 310 is arranged to produce a signal turning off transistor MP1 decoupling the charging signal from reaching cell 140. When the signal at node N10 indicates to put the battery pack in storage sleep-mode, switch SW1 is closed coupling resistor circuit R2 between node N11 and node N12. The signal at node N10 is high during the times FF2 is set. When the signal at node N10 is low, transistor MP1 allows current to pass, and switch SW1 is open.

Although transistor MP1 is shown as a power PMOSFET, transistor MP1 may be an NPN transistor, a PNP transistor, a Bipolar device, a MOS device, a GaAsFET device, a JFET device, as well as one or more components that are arranged to provide the function of transistor MP1 in the above described example. For example, back-to-back configured series devices may be used. Similarly, transistor MP1 may be arranged in a switched body configuration.

Figure 4A:
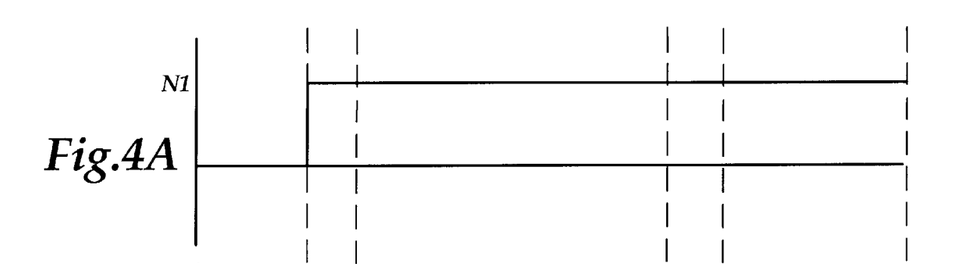
FIGS. 4A–4F show exemplary signal waveforms in a storage sleepmode system.

FIGS. 4A–4F show exemplary diagrams illustrating signals for controlling the storage sleep-mode system. Referring now to FIG. 4A, a waveform is shown illustrating the signal at node N1 (FIG. 2) over time. From time to through t1 the signal is low (logic "0"), from time t1 through time t5 the signal is high (logic "1"). When the signal at node 1 is high, the cell is in a usable mode.

Figure 4B:
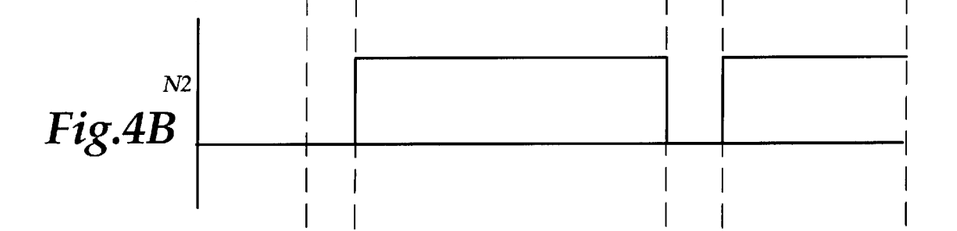

FIG. 4B shows an exemplary waveform of the signal at node N2 (FIG. 2) over time. From time t2 through t3 and t4 through t5 the signal at node N2 is high. At all other times, the signal is low. The time from t1 through t2 shows the lag time for the signal to reach node N2 from node N1. When the signal at node N1 and node N2 is high the battery pack may be placed into the storage sleep-mode.

Figure 4C:
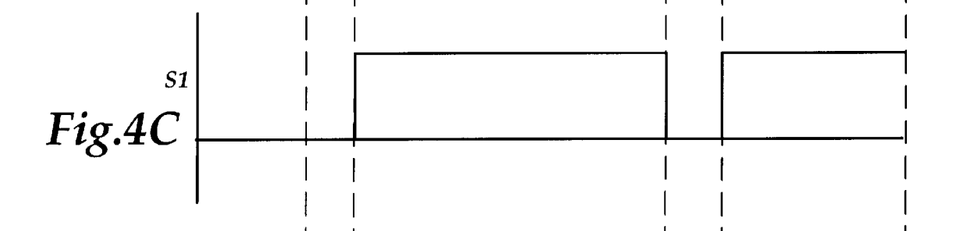

FIG. 4C shows an exemplary graph of the value of the signal at the S1 input of FF1 (FIG. 2) over time. When FF1 is set, the battery pack may be placed into the storage sleep-mode. As discussed above, when the signal at node N1 and node N2 is high the battery pack may be placed into storage sleep-mode. When the S1 input is high, the signal at nodes N1 and N2 is high. Referring to FIG. 4C, from time t2 through t3 and t4 through t5 the signal at the S1 input of FF1 is high, setting FF1. At all other times, the signal is low.

Figures 4D, 4E, 4F:
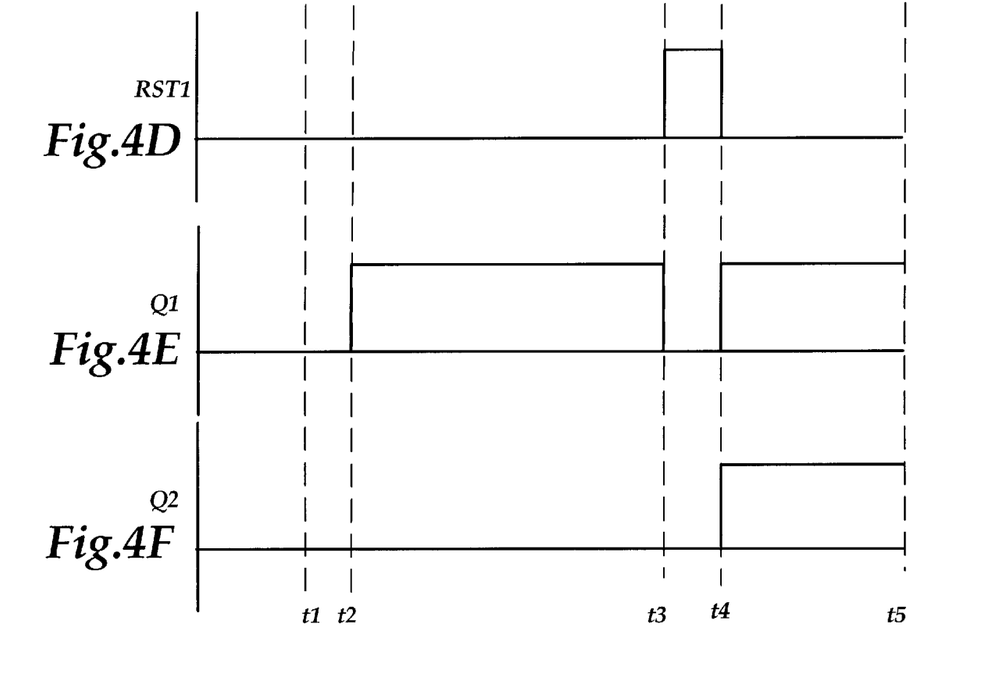

FIG. 4D shows an exemplary graph of the signal at the RST1 input of FF1 (FIG. 2) over time. From time t3 through t4, the signal at RST1 of FF1 is high. At all other times, the value of the signal is low. The signal at RST1 of FF1 is high when either the signal at node N1 is high and the signal at node N2 is low, or when the signal at node N2 is high and the signal at node N1 is low. When FF1 is reset, the battery pack may not be placed into the storage sleep-mode.

FIG. 4E shows an exemplary graph of the signal at the Q1 output of FF1 (FIG. 2) over time. From time t2 through t3 and t4 through t5 the signal at Q1 is high. At all other times, the signal is low. When Q1 is high the cell may be placed into the storage sleep-mode.

FIG. 4F shows an exemplary graph of the signal at the Q2 output of FF2 (FIG. 2) over time, assuming that the signal at the RST2 input of FF2 is low. From time to through t4 the signal at the Q2 output is low. At all other times the signal is high. The signal at Q2 is used as the activate storage sleep-mode according to one embodiment of the invention.

Figure 5:
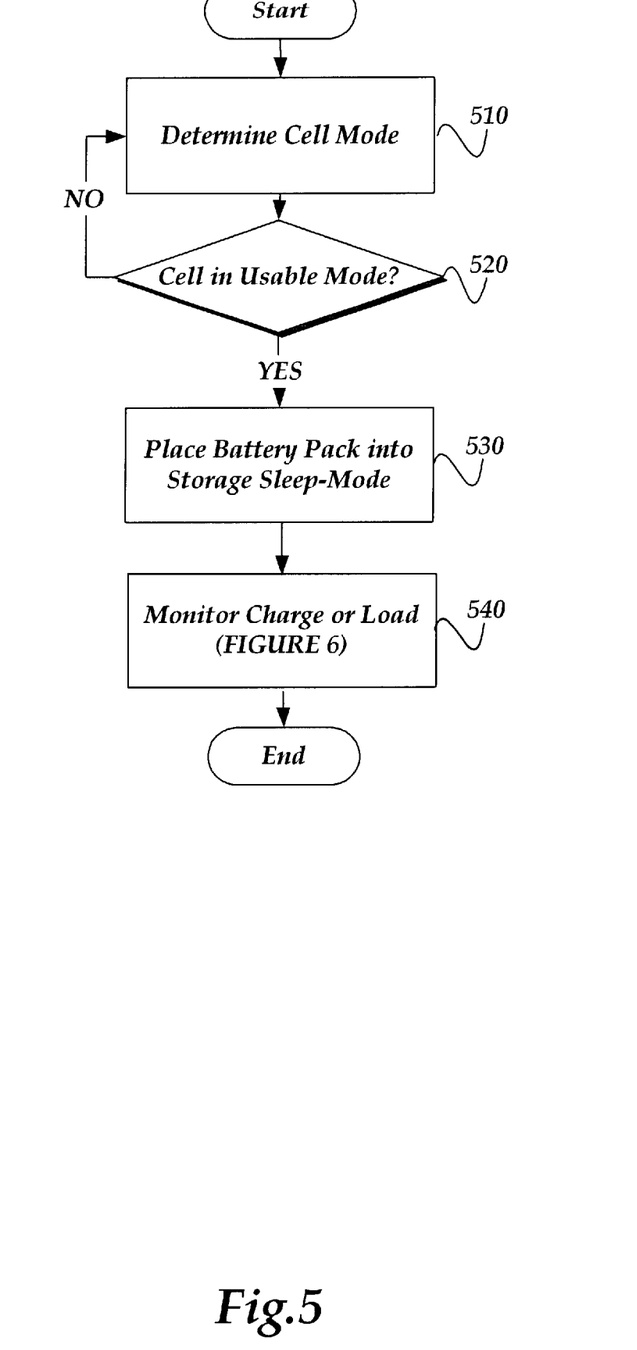
FIG. 5 shows a logical flow for a storage sleep-mode system.

FIG. 5 shows a logical flow for a storage sleep-mode system according to one embodiment of the invention. After a start block, the logical flow moves to a block 510 where the logic determines the cell mode. According to one embodiment of the invention, the cell mode may be a usable mode or an unusable mode. The cell mode may be based on various cell characteristics. For example, the cell mode may be based on the cell voltage. According to one embodiment of the invention, the cell mode is set to a usable mode when the voltage of the cell is above a sleep state and below a charge-termination state, and to an unusable mode at all other times. The tolerances of the thresholds may be adjusted based on the characteristics of the battery pack. For example, according to one embodiment of the invention, the usable mode's upper limit is set a sufficient amount below the charge-termination state to help ensure that the cell is not stored at a charge level that may result in the cell's life being unnecessarily diminished. Moving to a decision block 520, a determination is made as to whether the cell mode is set to a usable mode. When the cell mode is set to an unusable mode, the logic returns to block 510. When the cell mode is within the usable range, the logic flows to a block 530 where the battery pack is placed into a storage sleep-mode. Transitioning to a block 540, the logic monitors the charge or load applied to the cell (See FIG. 6 and related discussion). The logical flow then ends.

Figure 6:
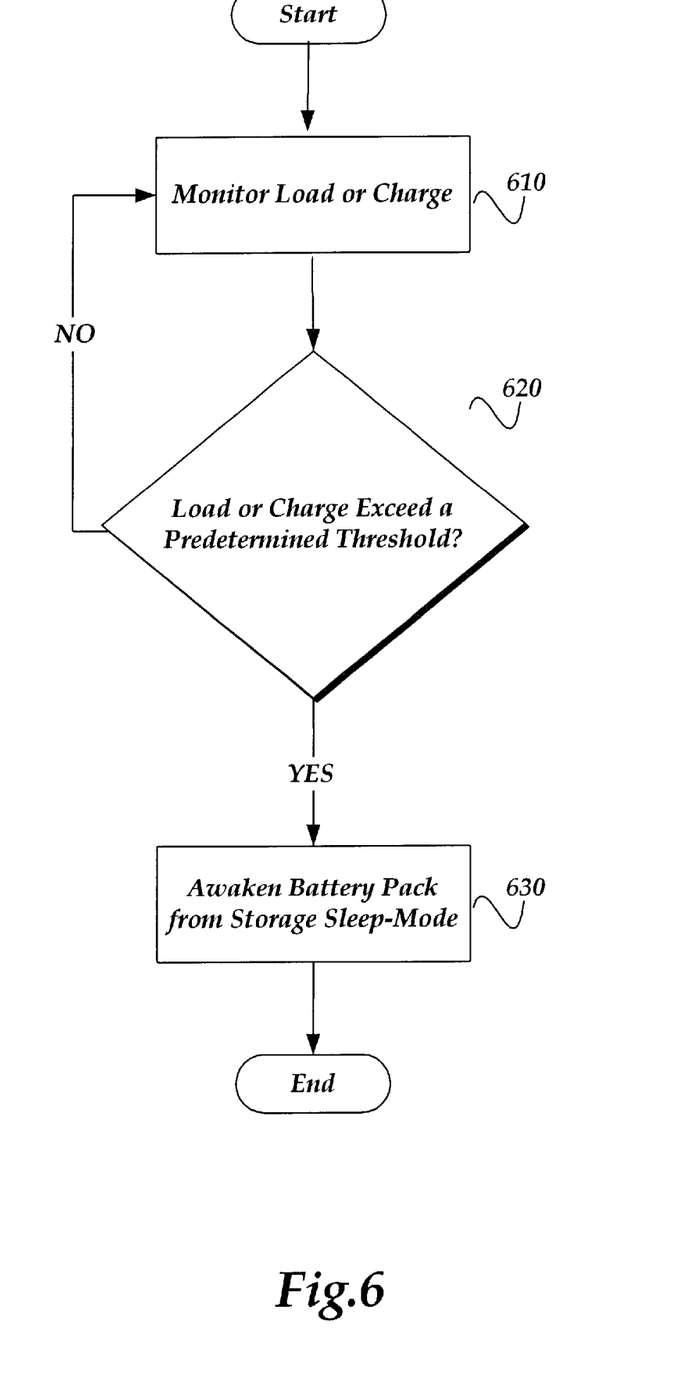
FIG. 6 illustrates a logical flow for monitoring the charge or load applied to a cell, according to one embodiment of the invention.

FIG. 6 illustrates a logical flow for monitoring the charge or load applied to the cell. After a start block, the logical flow moves to a block 610 that monitors the load or charge across the terminals of the battery pack. Moving to a decision block 620, a determination is made as to whether the load or charge exceeds a predetermined threshold. The predetermined threshold may be set based on the charger or typical load attached to the cell. For example, if the minimum load on a cell is 20 mA, the load threshold may be set to a level that keeps the battery pack in storage sleep-mode until a load approaching 20 mA is reached. This helps to ensure that other loads on the cell do not awaken the battery pack from the storage sleep-mode. When the load or charge exceeds the predetermined threshold, the logic flows to a block 630, where the battery pack is awakened from the storage sleepmode. When the load or charge does not exceed the predetermined threshold, the logic returns to block 610 to continue monitoring. The logic flow then ends.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for placing a battery pack into a storage sleep-mode, comprising:
   a charger circuit that is arranged to provide a mode signal indicating cell is in a usable mode in response to a mode of the cell;
   a storage sleep-mode circuit that is arranged to receive the mode signal and in response to the mode signal place the battery pack into the storage sleep-mode; and
   a detection circuit that is arranged to determined when an applied charge or load to the cell exceeds a predetermined threshold, and when the applied charge or load exceeds the predetermined threshold awaken the battery pack from the storage sleep-mode.

2. The apparatus of claim 1, wherein the predetermined threshold is based on a charger or a typical load applied to the cell.

3. The apparatus of claim 1, wherein the detection circuit, further comprises a comparator circuit that is arranged determine when the charge or load applied to the cell exceeds the predetermined threshold.

4. An apparatus for placing a battery pack into a storage sleep-mode, comprising:
   a charger circuit that is arranged to provide a mode signal in response to a mode of a cell;
   a storage sleep-mode circuit that is arranged to receive the mode signal and in response to the mode signal place the battery pack into the storage sleep-mode; the storage sleep-mode circuit comprising:
      a prevention circuit arranged to prevent placing the battery pack into the storage sleep-mode inadvertently; and
      a set circuit coupled to the prevention circuit that is arranged to activate the storage sleep mode and awaken the battery pack from the storage sleep-mode; and
   a detection circuit that is arranged to determined when an applied charge or load to the cell exceeds a predetermined threshold, and when the applied charge or load exceeds the predetermined threshold awaken the battery pack from the storage sleep-mode.

5. The apparatus of claim 1, wherein the cell is in the usable mode when a voltage of the cell is within a nominal range.

6. The apparatus of claim 5, wherein the nominal range is defined to be between a first potential where the battery pack is in a sleep mode and a second potential where the cell is at a charge terminate point.

7. The apparatus of claim 6, wherein the second potential is set lower than the charge terminate point.

8. The apparatus of claim 1, further comprising a charging circuit arranged to receive the mode signal and in response to the mode signal charge the cell.

9. The apparatus of claim 1, wherein the detection circuit, further comprises, a coupling circuit that is arranged to provide a charging signal to the cell during a normal operation.

10. The apparatus of claim 9, wherein the coupling circuit is arranged to decouple the charging signal from the cell when the battery pack is placed into the storage sleep-mode.

11. The apparatus of claim 10, wherein the coupling circuit comprises a transistor circuit.

12. A method for placing a battery pack into a storage-sleep mode, comprising:
    determining a cell mode indicating a cell is in a usable mode;
    placing the battery pack into the storage sleep-mode based on the cell mode; and
    monitoring a charge or load applied to the cell to determine when to awaken the battery pack from the storage sleep-mode.

13. The method of claim 12, further comprising awakening the battery pack from the storage sleep-mode when the charge or load applied to the cell exceeds a predetermined threshold.

14. The method of claim 12, wherein the predetermined threshold is based on a charger or a typical load attached to the cell.

15. The method of claim 14, wherein determining the cell mode, further comprises:
    measuring a characteristic of the cell; and
    determining the cell mode based on the measured characteristic.

16. The method of claim 14, wherein monitoring the charge or load applied to the cell to determine when to awaken the battery pack from the storage sleep-mode, further comprises:
    monitoring the charge or load across terminals of the cell; and
    determining when the charge or load exceeds the predetermined threshold.

17. An apparatus for placing a battery pack into a storage-sleep mode, comprising:
    a means for determining a cell mode of a cell indicating the cell is in a usable mode;
    a means for placing the battery pack into the storage sleep-mode based on the cell mode; and
    a means for monitoring a charge or load applied to a cell; and
    a means for awakening the battery park from the storage sleep-mode when the charge or load applied to the cell exceeds a predetermined threshold.

18. The apparatus of claim 17, wherein the predetermined threshold is based on a charger or a typical load attached to the cell.

* * * * *

UNITED STATES PATENT AND TRADEMARK OFFICE
CERTIFICATE OF CORRECTION

PATENT NO. : 6,545,447 B1
DATED : April 8, 2003
INVENTOR(S) : Smith

It is certified that error appears in the above-identified patent and that said Letters Patent is hereby corrected as shown below:

<u>Column 4,</u>
Line 52, "sleepmode" should read -- sleep-mode --

<u>Column 5,</u>
Line 54, "to" should read -- t0 --

<u>Column 6,</u>
Line 23, "to" should read -- t0 --

<u>Column 7,</u>
Line 14, "...a charger circuit that is arranged to provide a mode signal indicating cell is in a usable mode in response to a mode of the cell; ..." should read -- ...a charger circuit that is arranged to provide a mode signal indicating a cell is in a useable mode in response to a mode of the cell; ... --
Line 29, "3. The apparatus of claim 1, wherein the detection circuit further comprises a comparator circuit that is arranged determine when the charge of load applied to the cell exceeds the predetermined threshold." should read -- The apparatus of claim 1, wherein the detection circuit further comprises a comparator circuit that is arranged to determine when the charge of load applied to the cell exceeds the predetermined threshold. --
Line 44, "sleepmode" should read -- sleep-mode --

<u>Column 8,</u>
Lines 45-46, "storage-sleepmode" should read -- storage sleep-mode --
Line 54, "park" should read -- pack --

Signed and Sealed this

Sixteenth Day of September, 2003

JAMES E. ROGAN
*Director of the United States Patent and Trademark Office*